March 28, 1933.  S. W. NELDNER  1,903,190
VALVE LOCK
Filed Nov. 24, 1930  2 Sheets-Sheet 1

Inventor
Stephen W. Neldner
By Refhusbrown
Attorney

March 28, 1933.      S. W. NELDNER      1,903,190
VALVE LOCK
Filed Nov. 24, 1930      2 Sheets-Sheet 2
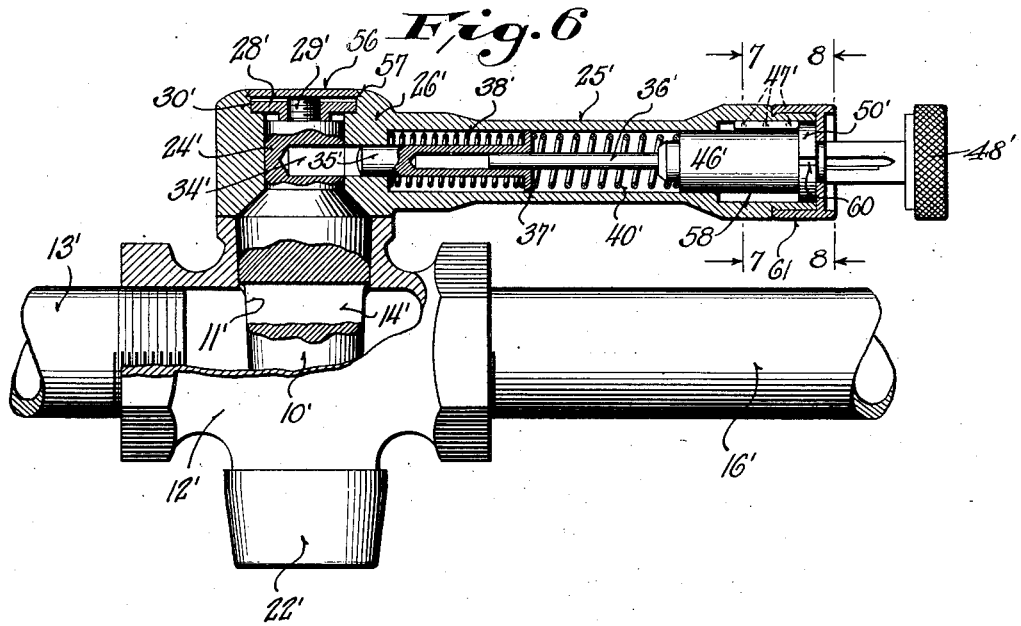
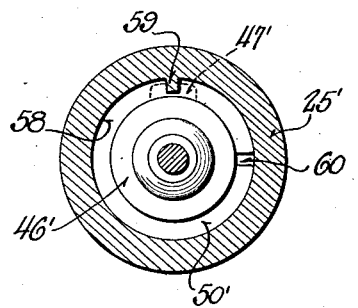
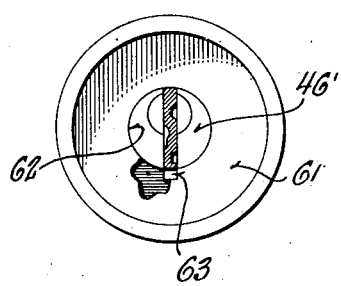
Inventor
Stephen W. Neldner
By Ralph W. Brown.
Attorney Patented Mar. 28, 1933

1,903,190

UNITED STATES PATENT OFFICE

STEPHEN W. NELDNER, OF MILWAUKEE, WISCONSIN

VALVE LOCK

Application filed November 24, 1930. Serial No. 497,764.

This invention relates to locks for preventing tampering with or unauthorized operation of valves, switches, or the like, and more particularly to built-in locks for the purpose mentioned.

One object of the present invention is the provision in a valve or the like of lock controlled mechanism for preventing operation thereof by rendering ineffective the operating means therefor. This I accomplish by a novel combination and arrangement of parts under the control of a lock for making and breaking the operating connection between the operating means and the part to be operated.

Another object is the provision of a built-in lock for the purposes mentioned of simple and economical design, which will render the valve or the like proof against unauthorized operation.

Other objects and advantages will appear from the following description of two illustrative embodiments of the present invention.

In the drawings:—

Figure 1:
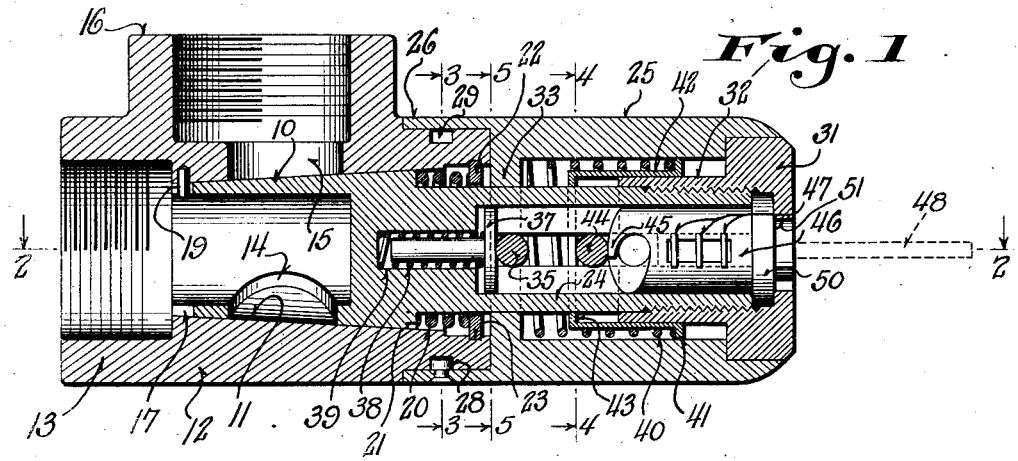
Figure 1 is an axial sectional view taken along the line 1—1 of Fig. 2 of a valve equipped with a lock mechanism constructed in accordance with the present invention.
Figure 3:
Figure 4:
Figure 5:
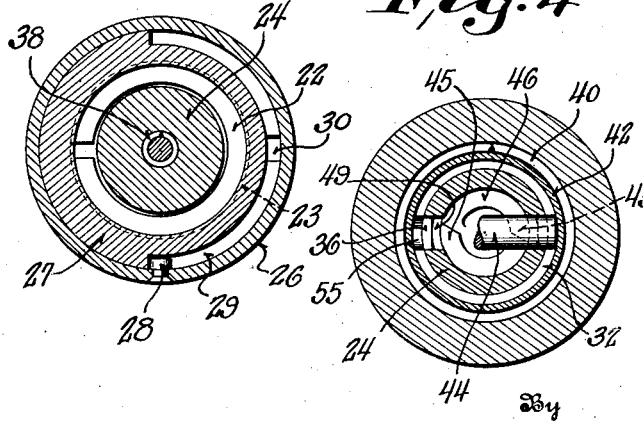
Figure 5:
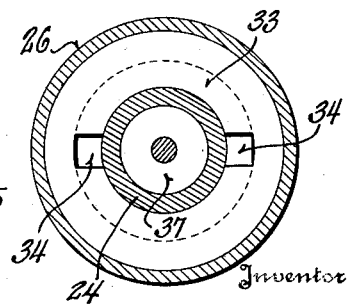

Figs. 3, 4, and 5 are transverse sectional views taken along the lines 3—3, 4—4, and 5—5, respectively, of Fig. 1.

Fig. 6 is a view, partly in elevation and partly in section, of another form of valve equipped with a modified form of lock mechanism embodying the present invention.

Figs. 7 and 8 are transverse sectional views, on a larger scale, taken along the lines 7—7 and 8—8, respectively, of Fig. 6.

Figure 2:
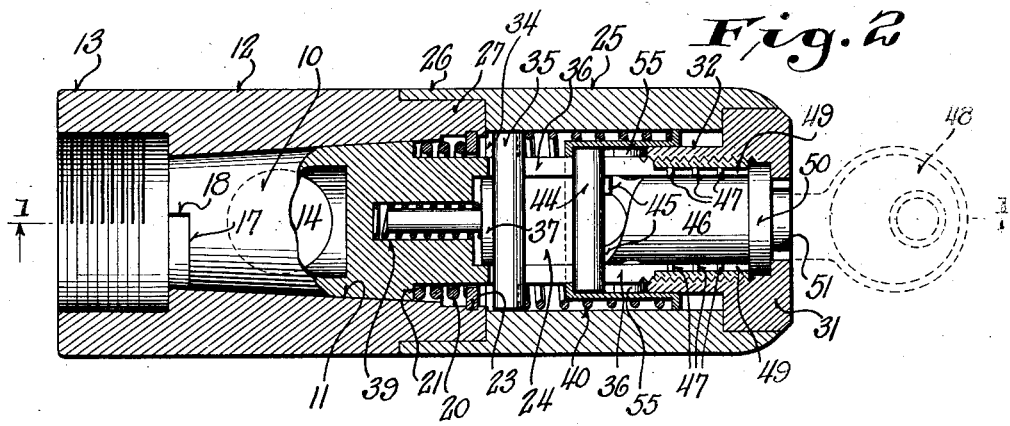
Fig. 2 is an axial sectional view on the line 2—2 of Fig. 1.

The valve shown in Figs. 1 and 2 comprises a hollow tapered plug 10, seated in the usual tapered bore 11 in the valve housing 12, and open to an internally threaded pipe connection 13. A port 14 in the wall of the plug 10 is adapted to register with a passage 15 in the housing, upon rotation of the plug through an angle of 180 degrees from the position shown to thereby establish communication between the connection 13 and a second pipe connection 16 communicating with the passage 15. A portion of the end of the plug 10 is cut away, as at 17, to form stop shoulders 18, which cooperate with a pin 19 in the bore to limit rotation of the plug. The plug is maintained in snug contact with the wall of the tapered bore 11 by a spring 20, interposed between an annular shoulder 21 on the plug and a split ring 22 seated in an internal groove 23 in the housing. The plug 10 carries a hollow operating stem 24 extending axially from one end thereof and preferably formed integral therewith.

In this instance the stem 24 is actuated and controlled by a sleeve 25 having an end flange 26 rotatably seated upon a cylindrical extension 27 of the valve housing. An internal stud 28 on the flange 26 projects into a peripheral groove 29 formed in the extension 27 to limit rotation of the sleeve. A short groove 30 (Fig. 3) leading from groove 29 to the end of the extension permits entry of the stud 28 into groove 29. The outer end of the sleeve 25 is closed by the head 31 of a bushing having a reduced portion 32 threaded onto the threaded end of the stem 24. An internal flange 33 formed in the inner end of the sleeve 25 surrounds the stem 24 and contains a pair of slots 34 (Fig. 5) arranged to receive the opposite ends of a cross pin 35, loosely engaged within and guided by a pair of longitudinal slots 36 formed in the wall of the stem 24. The pin 35 is yieldably urged out of engagement with the slots 34 by a plunger having a head 37 guided within the stem 24 and bearing against the pin 35, the plunger being urged outwardly by a spring 38 seated within an axial bore 39. A heavier spring 40 surrounding the stem 24 bears against the ends of the pin 35 to force it inwardly. The outer end of spring 40 bears against an external flange 41 formed on the outer end of a sleeve 42, which is disposed within the spring 40 and slidably mounted on the reduced portion 32 of the bushing.

The inner end of sleeve 42 is formed with an internal flange 43 for receiving the opposite ends of a cross pin 44, also engaged in and guided by the longitudinal slots 36 formed in the stem 24. This pin 44 is actuated and controlled by a pair of hook-shaped cam members 45 formed on the end of a cylinder 46 rotatably seated within the outer end of the hollow stem 24. Except for the cam members 45 the cylinder 46 constitutes a conventional part of a cylinder type lock of well known construction. It contains a plurality of tumbler elements 47 which normally project outwardly from the sides of the cylinder as indicated in Fig. 2, but all of which may be withdrawn into the cylinder in a manner well known by the insertion of a properly designed key 48 thereinto. In this instance internal longitudinal grooves 49 are formed in the hollow stem 24 to receive and engage the tumblers 47, when extended, to thereby prevent rotation of the cylinder 46 within the stem until the tumblers are withdrawn by the insertion of the proper key. The cylinder 46 is provided with the usual end flange 50 which in this instance is confined between the end of the stem 24 and the head 31 of the bushing to retain the cylinder against endwise movement. The head 31 is provided with a central opening 51 to admit the key to the cylinder and to permit rotation thereof with the cylinder.

In the position of the parts indicated in Figs. 1 and 2 the pin 44 bears against the high portions of the cams 45, so that it and the sleeve 42 are advanced and the spring 40 is compressed to hold the pin 35 in advanced position with the ends thereof engaged in the slots 34 in the flange 33 of the sleeve 25. The pin 35, thus engaged with the slots 34, provides an operating connection between the sleeve 25 and valve stem 24 through which the valve plug 10 may be rotated by rotation of the sleeve 25. Thus with the parts in the position shown the valve may be operated to effect or block communication between the pipe connections 13 and 16.

It will be further noted that in the position of the parts shown in Figs. 1 and 2 the several tumblers 47 of the lock are engaged with the grooves 49 in the stem 24 so that the cylinder 46 is retained thereby against rotation. To render the sleeve 25 ineffective on the valve stem 24 the several tumblers 47 are withdrawn from the grooves 49 by the insertion of the key 48 into the cylinder, whereupon the cylinder may be rotated by rotation of the key to thereby position the low portions of the cams 45 against the pin 44. The pin 44 and sleeve 42 are thus retracted to thereby relieve the pressure in spring 40 and permit the spring 38 to force the pin 35 out of engagement with the notches 34 in the flange 33 of the sleeve 25. The operating connection between the sleeve 25 and valve stem 24 is thus destroyed, so that the valve remains undisturbed by rotation of sleeve 25. Then upon withdrawal of the key the tumblers 47 again project into engagement with the slots 49 and the cylinder 46 is retained against rotation.

The pressure of the spring 20 upon the tapered valve plug 10 maintains sufficient pressure between the plug and bore 11 to frictionally retain the plug against rotation by attempted rotation of the bushing 31. When the pin 44 is in its retracted position against the low portions of the cams 45 the ends of the pin engage notches 55 in the end of the reduced portion 32 of the bushing to thereby lock the bushing onto the stem 24.

The valve lock mechanism shown in Figs. 6, 7 and 8 is similar in many respects to that shown in Figs. 1 to 5, and is illustrated as applied to a valve of somewhat different form. The valve shown in Fig. 6 comprises a tapered plug 10' seated within a tapered bore 11' formed in the housing 12'. The plug 10' is retained in the bore in a well-known manner, by a lock nut not shown applied to the lower end of the plug and enclosed within a cover 22' applied to the housing. The plug 10' contains a transverse passage 14' adapted to establish communication between the pipes 13' and 16' when the plug is turned into the position shown. When rotated through an angle of ninety degrees from the position shown the plug blocks communication between these pipes. A relatively short operating stem 24' projects upwardly from the large end of the plug and provides a support for a hollow operating handle 25' having a head 26' bored to receive the stem. The head 26' is rotatable on the stem and retained thereon by a flat nut 28' threaded onto a stud 29' on the stem and seated in a socket 30' formed in the head. A disk 56 pressed into an undercut groove 57 in the socket prevents access to the nut 28' and stem 24'.

The locking mechanism shown in Figs. 6, 7 and 8 comprises a pin 35' fitted for lengthwise movement within the head 26' and axially of the handle 25'. The inner end of the pin 35' is projectable into a bore 34' formed in the stem 24' to provide an operating connection between the handle and stem. A spring 38' within the handle bears against a head 37' of the pin 35' to yieldably retain the same in the retracted position shown. A heavier spring 40' is interposed between the head 37' of pin 35' and the end of a cylinder 46' mounted for rotation and lengthwise movement within the handle. The cylinder carries a guide rod 36' telescopically engaged within the pin 35' but in other respects is substantially identical with the cylinder 46 hereinabove mentioned. It contains a plurality of tumblers 47' which, in the absence of a key, project outwardly, as indicated in dotted lines in Figs. 6 and 7, and which are withdrawable into the cylinder by the insertion of a key 48' of proper configuration.

In this instance the end flange 50' of the cylinder is fitted within a bore 58 formed within the outer end of the handle. A longitudinal internal rib 59 formed in the bore 58 cooperates with the flange 50' to normally prevent lengthwise movement of the cylinder 46', except when a slot 60 in the flange is aligned with the rib. The several tumbers 47' are slotted to receive and interlock with the rib 59, as indicated in Figs. 6 and 7, so as to retain the cylinder in such position that the slot 60 is out of alignment with the rib 59. The outer end of the bore 58 is closed by a cap 61 fixed to the end of the handle and containing a central circular opening 62 for admitting the key 48' to the cylinder. The key can be inserted and removed from the cylinder only when aligned with a notch 63 in the periphery of the opening 62 (see Fig. 8) and in this position of the key and cylinder the tumblers 47' are aligned with the rib 59.

With the parts in the position shown the pin 35' is retracted and the handle 25' is free to swing about the stem 24' without affecting the position of the valve plug 10'. To operate the valve the key 48' is inserted into the cylinder 46' to thereby withdraw the tumblers 47' from the rib 59; the key is then turned so as to rotate the cylinder 46' until slot 60 is aligned with the rib 59 whereupon the key and cylinder 46' are advanced longitudinally until the end flange 50' reaches the inner end of the bore 58; and finally the key and cylinder are further rotated to shift the slot 60 out of alignment with the rib 59 to thereby retain the cylinder in this advanced position. The advance of the cylinder 46' compresses the spring 40' and thus urges the pin 35' forwardly so that when the bore 34' is aligned with the pin 35' by swinging the handle 25' on the stem 24', the pin 35' projects into the bore 34' and forms an operating connection between the handle and stem. The stem and valve plug 10' may then be rotated by swinging the handle 25' to thereby open or close the valve.

To again render the valve operating means ineffective the cylinder 46' is again rotated by rotation of the key until the slot 60 is aligned with rib 59, the cylinder 46' is retracted until the flange 50' is again in the outer end of the bore 58, after which the cylinder and key are further rotated until the key is aligned with the notch 63, whereupon the key is withdrawn and the tumblers 47' project into interlocking engagement with the rib 59 to retain the cylinder against rotation. When the cylinder 46' is thus retracted the pressure in spring 40' is thereby reduced and the pin 35' is automatically retracted from the bore 34' by the spring 38', so that the handle 25' is then free to swing about the stem 24' without affecting the position of the valve plug 10.

Various changes may be made in either embodiment of the invention hereinabove specifically described without departing from or sacrificing the advantages of the invention as defined in the appended claims.

I claim:—

1. In a device of the character described the combination of a housing, a member movable therein, a second member outside of said housing for operating said member, a recess in one of said members, an element permanently engaged with the other of said members and engageable in said recess to form an operating connection between said members, yieldable means urging said element out of engagement with said recess to render said connection ineffective, and lock controlled yieldable means for advancing said element into engagement with said recess to thereby render said connection effective.

2. In a device of the character described the combination of a rotatable member, a longitudinally slotted stem connected with said member, a sleeve rotatable on said stem and having a recess, an element permanently engaged within said slotted stem and movable into said recess to form an operating connection between said sleeve and stem, resilient means for yieldably retaining said element out of said recess, and lock controlled means for shifting said element into said recess against the resistance of said resilient means.

3. In a device of the character described the combination of a housing, a member movable therein, a stem for operating said member, a rotatable sleeve surrounding and enclosing said stem, an element movable to effect a releasable operating connection between said sleeve and stem, lock controlled means for controlling said element, a closure for the outer end of said sleeve, and releasable means controlled by said lock controlled means for preventing removal of said closure except when said lock controlled means is in predetermined position.

In witness whereof, I hereunto subscribe my name this 9 day of Oct., 1929.

STEPHEN W. NELDNER.